(12) United States Patent
Sabnis

(10) Patent No.: US 9,731,837 B2
(45) Date of Patent: Aug. 15, 2017

(54) SERVO TRANSPARENCY WARNING SYSTEM AND METHOD

(71) Applicant: HONEYWELL INTERNATIONAL INC., Morristown, NJ (US)

(72) Inventor: Rohini Sabnis, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 125 days.

(21) Appl. No.: 14/624,024

(22) Filed: Feb. 17, 2015

(65) Prior Publication Data
US 2016/0251086 A1  Sep. 1, 2016

(51) Int. Cl.
| | | |
|---|---|---|
| *B64D 43/00* | (2006.01) | |
| *B64C 27/00* | (2006.01) | |
| *B64C 27/04* | (2006.01) | |
| *B64D 45/00* | (2006.01) | |
| *B64D 43/02* | (2006.01) | |

(52) U.S. Cl.
CPC ............ *B64D 43/00* (2013.01); *B64C 27/006* (2013.01); *B64C 27/04* (2013.01); *B64D 43/02* (2013.01); *B64D 45/00* (2013.01); *B64D 2045/0085* (2013.01)

(58) Field of Classification Search
CPC  B64D 43/00; B64D 45/00; B64D 2045/0085; B64C 27/04; B64C 27/006
USPC .......... 701/7, 14, 3, 9, 4; 340/945, 970, 963, 340/964, 967, 438; 342/104
See application file for complete search history.

(56) References Cited

U.S. PATENT DOCUMENTS

| | | | |
|---|---|---|---|
| 4,035,705 A | 7/1977 | Miller | |
| 8,914,164 B1 | 12/2014 | Nathan et al. | |
| 2003/0225492 A1* | 12/2003 | Cope ..................... | G07C 5/008 701/33.4 |
| 2010/0023264 A1* | 1/2010 | G. ........................... | G08G 5/04 701/301 |
| 2010/0094488 A1 | 4/2010 | Michal et al. | |

(Continued)

FOREIGN PATENT DOCUMENTS

| | | |
|---|---|---|
| CA | 2820001 A1 | 6/2012 |
| EP | 1962163 A1 | 8/2008 |

(Continued)

OTHER PUBLICATIONS

EP Extended Search Report for Application No. 16154953.0-1754 dated Jun. 24, 2016.

(Continued)

*Primary Examiner* — Marthe Marc-Coleman
(74) *Attorney, Agent, or Firm* — Lorenz & Kopf, LLP

(57) ABSTRACT

Systems and methods of warning a pilot of a helicopter about a servo transparency condition include devices and steps for retrieving, from a design performance database, a plurality of design performance parameters of the helicopter, and receiving avionics data from an avionics data source, the avionics data representative of a plurality of actual performance parameters of the helicopter. The design performance parameters and the avionics data are processed to determine whether one or more of the actual performance parameters exceed the design performance parameters, thereby indicating a servo transparency condition exists. One or more alerts are generated when the servo transparency condition exists.

13 Claims, 4 Drawing Sheets

(56) References Cited

U.S. PATENT DOCUMENTS

2013/0197725 A1* 8/2013 O'Dell ................. B64F 5/0045
                                                    701/14
2014/0052314 A1   2/2014 Ostrom et al.
2015/0235560 A1*  8/2015 Enns ...................... G08G 5/02
                                                    701/17

FOREIGN PATENT DOCUMENTS

KR    20110026625 A  *  3/2011
KR    1020110026625 A   3/2011
KR    1020140106151 A   9/2014

OTHER PUBLICATIONS

Thales; Helicopter Tawa: Enhance flight safety while maintaining full operation capabilities; 2013.
Safe Flight Instrument; Exceedance Warning System; Copyright © 2013 Safe Flight Instrument Corporation.

* cited by examiner

SERVO TRANSPARENCY WARNING SYSTEM AND METHOD

TECHNICAL FIELD

The present invention generally relates to helicopter maneuverability, and more particularly relates to a system and method of warning helicopter pilots of a servo transparency condition.

BACKGROUND

Under certain circumstances, helicopters may experience a phenomenon known as servo transparency. Servo transparency, which is also known as servo reversibility or jack stall, may occur when the helicopter is subjected to high maneuvering loads, high forward airspeed, high gross weight, and high pressure altitudes. It is difficult for the pilots understand this phenomenon, and immediately take corrective action.

The servo transparency phenomenon occurs smoothly and, if properly anticipated, can be managed. However, in some documented cases, pilots have misinterpreted servo transparency as a hydraulic system lock. As a result, the pilots implemented inappropriate corrective action. Presently, there is no mechanism in place to warn pilots of the potential for servo transparency, or that the helicopter is in fact experiencing servo transparency.

Hence, there is a need for a system and method to warn helicopter pilots of the potential for servo transparency and/or that the helicopter is in fact experiencing servo transparency. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a servo transparency warning system for a helicopter includes a performance database, an avionics data source, and a processor. The performance database has stored therein design performance parameters of the helicopter that contribute to servo transparency of the helicopter. The avionics data source is configured to supply avionics data representative of actual performance parameters that contribute to servo transparency of the helicopter. The processor is coupled to receive the avionics data from the avionics data source and is configured, upon receipt thereof, to compare the actual performance parameters to the design performance parameters and, based upon this comparison, selectively generate one or more alert signals.

In another embodiment, a servo transparency warning system for a helicopter includes a performance database, an avionics data source, a processor, a visual alert device, and an aural alert device. The performance database has stored therein design performance parameters of the helicopter that contribute to servo transparency of the helicopter. The avionics data source is configured to supply avionics data representative of actual performance parameters that contribute to servo transparency of the helicopter. The processor is coupled to receive the avionics data from the avionics data source and is configured, upon receipt thereof, to compare the actual performance parameters to the design performance parameters and, based upon this comparison, to selectively generate a visual alert signal and an aural alert signal. The visual alert device is coupled to receive the visual alert signal and is configured, upon receipt thereof, to generate one or more visual alerts. The aural alert device is coupled to receive the aural alert signal and is configured, upon receipt thereof, to generate an audible sound.

In yet another embodiment, a method of warning a pilot of a helicopter about a servo transparency condition includes retrieving, from a design performance database, a plurality of design performance parameters of the helicopter, and receiving avionics data from an avionics data source, the avionics data representative of a plurality of actual performance parameters of the helicopter. The design performance parameters and the avionics data are processed to determine whether one or more of the actual performance parameters exceed the design performance parameters, thereby indicating a servo transparency condition exists. One or more alerts are generated when the servo transparency condition exists.

Furthermore, other desirable features and characteristics of the servo transparency warning system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
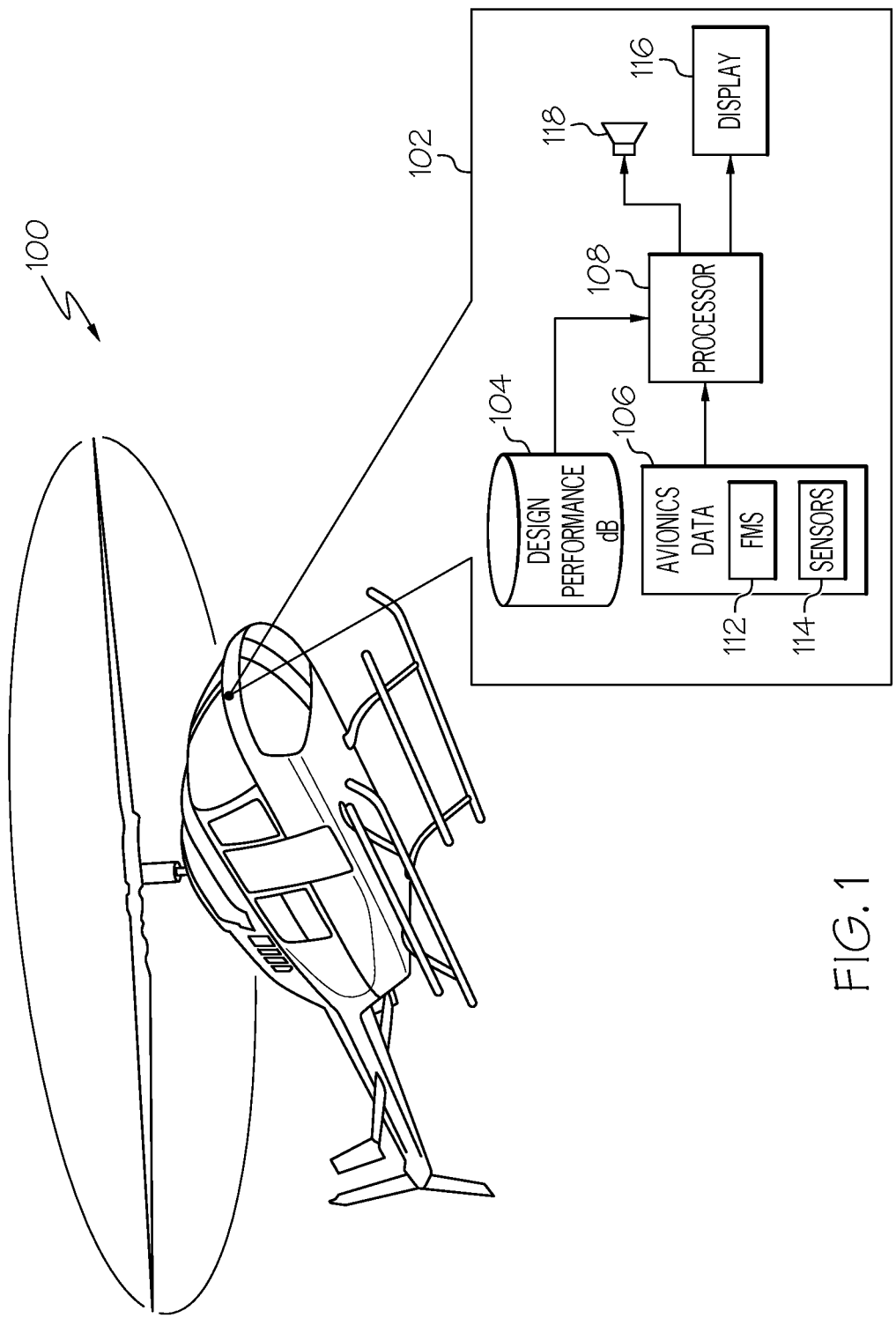
FIG. 1 depicts a perspective view of a helicopter and a functional block diagram of one embodiment of a servo transparency warning system installed in the helicopter.

Referring now to FIG. 1, a perspective view of a helicopter 100 is depicted. The helicopter 100 includes various systems and subsystems, including a servo transparency warning system 102. The helicopter 100 may be any one of numerous helicopter models, both civilian and military, manufactured by any one of numerous helicopter manufacturers. The servo transparency warning system 102 is installed in the helicopter 100, and is configured to warn the helicopter pilot of an impending or actual servo transparency condition. A functional block diagram of one embodiment of the servo transparency warning system 102 installed in the helicopter 100 is also depicted in FIG. 1, and will now be described.

The depicted servo transparency warning system 102 includes at least a design performance database 104, an avionics data source 106, and a processor 108. The design performance database 104 has data representative of various design performance parameters of the helicopter 100 stored therein. It should be noted that, at least as used herein, a design performance parameter is a performance parameter limit of the helicopter 100, and that is typically published in the flight manual associated with the helicopter 100.

It will be appreciated that the specific design performance parameters of the helicopter 100 that are stored in the design performance database 104 may vary, but in the depicted embodiment the design performance parameters include at least those that contribute to a servo transparency condition of the helicopter 100. Although these design performance parameters may also vary, in the depicted embodiment these include at least design airspeed, design altitude, design pitch angle, and design gross weight. Moreover, although the design performance database 104 is depicted as being implemented physically separate from the processor 108, it may be implemented, partially or wholly, as part of the processor 108.

The avionics data source 106 is configured to supply avionics data representative of actual performance parameters that contribute to servo transparency of the helicopter 100. The avionics data that the avionics data source 106 supplies may also vary but, as may be readily appreciated, includes at least data representative of the same performance parameters stored in the design performance database 104. Thus, in the depicted embodiment, the avionics data source 106 supplies data representative of actual helicopter airspeed, altitude, pitch angle, and gross weight.

It will be appreciated that the avionics data source 106 may be variously implemented, but in the depicted embodiment it includes a flight management system (FMS) 112 and a plurality of sensors 114. The FMS 112 is configured, among various other functions, to supply data representative of actual helicopter gross weight. The sensors 114, which may also be variously implemented, are configured to sense and supply data representative of actual helicopter airspeed, altitude, and pitch angle.

Regardless of how the design performance database 104 and the avionics data source 106 are specifically implemented, the processor 108 is coupled to receive, in real-time, the avionics data from the avionics data source 106. The processor 108 is also coupled to at least selectively retrieve data from the design performance data source. The processor 108 is configured, upon receipt of the avionics data, to compare the actual performance parameters to the design performance parameters. The processor 108 is further configured, based upon this comparison, to selectively generate one or more alert signals.

The alert signals that the processor 108 generates may vary in form and content. For example, the alert signals may include visual alert signals, aural alert signals, or both. As may be appreciated, the visual alert signal are used to generate visual alerts, the aural alert signals are used to generate aural alerts. In the depicted embodiment, the processor 108 is configured to generate both visual and aural alert signals. Thus, as FIG. 1 depicts, the system 100 includes both a visual alert device 116 and an aural alert device 118.

The visual alert device 116, as well as the specific visual alert (or alerts) may vary. For example, the visual alert device 116 may be a single light, a plurality of lights, a dedicated display device, or one of the flight deck displays. In the depicted embodiment, the visual alert device 116 is one of the flight deck displays, such as the one depicted in FIG. 2, which is responsive to the visual alert signals supplied by the processor 108 to generate one or more visual alerts.

Figure 2:
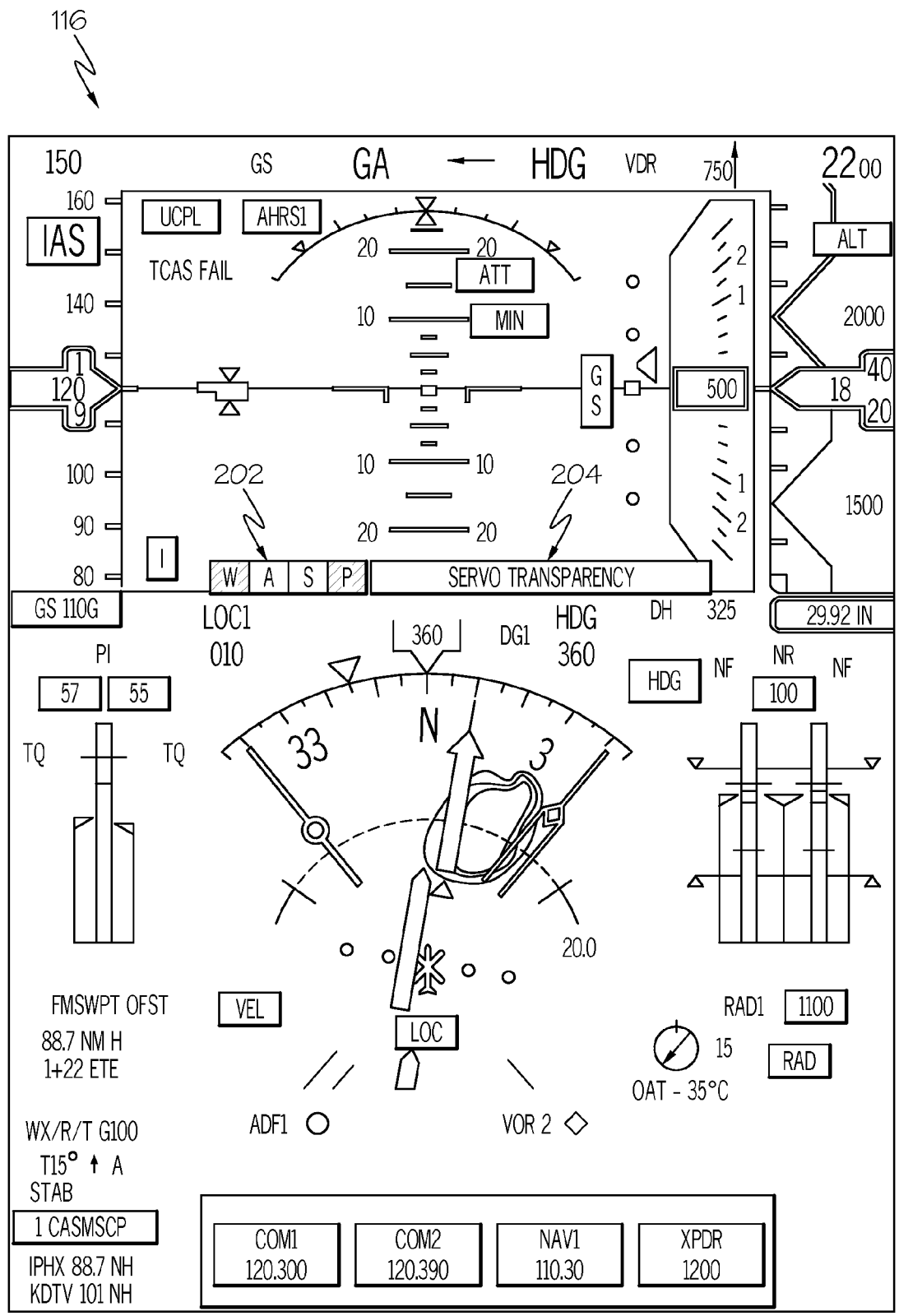
FIG. 2 depicts one example cockpit display that may be installed in the helicopter of FIG. 1 and used to implement a visual alert device in the system depicted in FIG. 1.

With continued reference to FIG. 2, it is seen that the specific visual alerts that the visual alert device 116 generates includes both a graphical alert 202 and a textual alert 204. The graphical alert 202 is used to alert the pilot as to which of the sensed performance parameters are exceeding the design performance parameters. The graphical alert 202 may be variously implemented, but it is preferably implemented using a plurality of individual graphical alerts, one for each design performance parameter that contributes to a servo transparency condition. In the depicted embodiment, there are four individual alerts, one each for gross weight (W), altitude (A), airspeed (S), and pitch angle (P). In some embodiments, the visual alert device 116 is responsive to the visual alert signals to selectively change the color of one or more of the individual alerts, to selectively render one or more of the individual alerts in color, to selectively change one of more of the individual alerts from being non-visible to being visible, or any one of numerous other schemes.

Figure 3A:
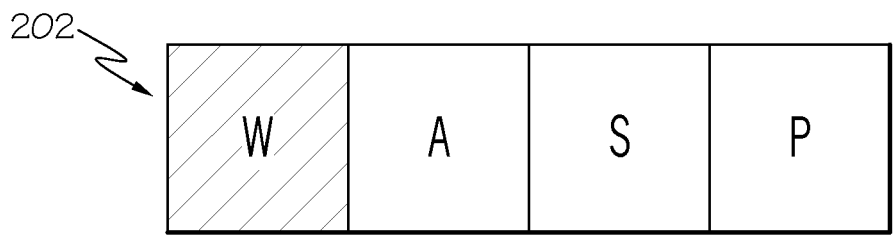
FIGS. 3A-3C depict various alert conditions of a graphical alert that may be rendered on the visual alert device.
Figure 3B:
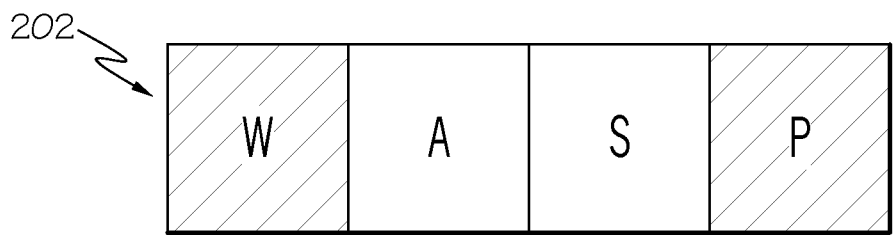
Figure 3C:
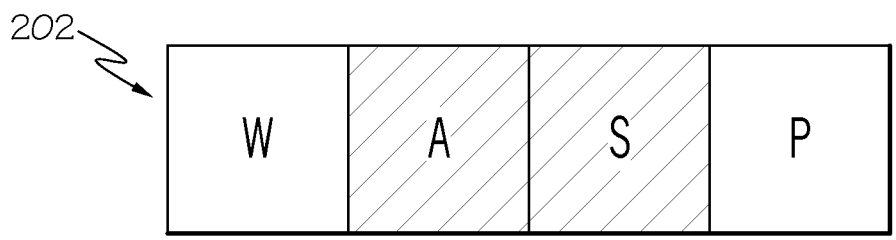

In one particular embodiment, which is illustrated most clearly in FIGS. 3A-3C, the visual alert device 116 is responsive to the visual alert signals supplied by the processor 108 to selectively render one or more of the individual alerts in color. In the example depicted in FIG. 3A, the actual gross weight of the helicopter exceeds the design gross weight, so the appropriate individual alert (W) is rendered in color, whereas the other individual alerts (A, S, P) are not. In the example depicted in FIG. 3B, the actual gross weight of the helicopter exceeds the design gross weight and the actual pitch angle exceeds the design pitch angle, so the appropriate individual alerts (W, P) are rendered in color, whereas the other individual alerts (A, S) are not. Finally, in the example depicted in FIG. 3C, the actual altitude and speed of the helicopter exceed the design altitude and design speed, respectively, so the appropriate individual alerts (A, S) are rendered in color, whereas the other individual alerts (W, P) are not.

Returning to FIG. 2, it is seen that the textual alert 204 is used to explicitly alert the pilot to the servo transparency condition. Although the textual alert 204 may also be variously implemented, in the depicted embodiment it is implemented by at least textually rendering the phrase "SERVO TRANSPARENCY". In some embodiments, the phrase may be rendered using a sufficiently prominent color, such as red, or yellow, or the like. The letters of the phrase may be rendered in this prominent color, or the area surrounding the letters may be rendered in the prominent color. In the depicted embodiment, the textual alert 204 is rendered proximate the graphical alert, though in other embodiments the graphical and textual alerts 202, 204 could be rendered at disparate locations on the visual alert device 116.

The aural alert device 118 may be implemented using any one of numerous known devices that are responsive to the aural alert signal supplied by the processor 108 to generate an audible sound. Regardless of its specific implementation, the aural alert signal generated and supplied by the processor 108 will cause the aural alert device to generate the audible phrase "SERVO TRANSPARENCY!" Thus, if the potential for a servo transparency condition exists or the helicopter 100 is in fact experiencing a servo transparency, both a visual and aural alert are generated. In response to these alerts being generated, the pilot will be better prepared to take appropriate actions to recover.

Figure 4:
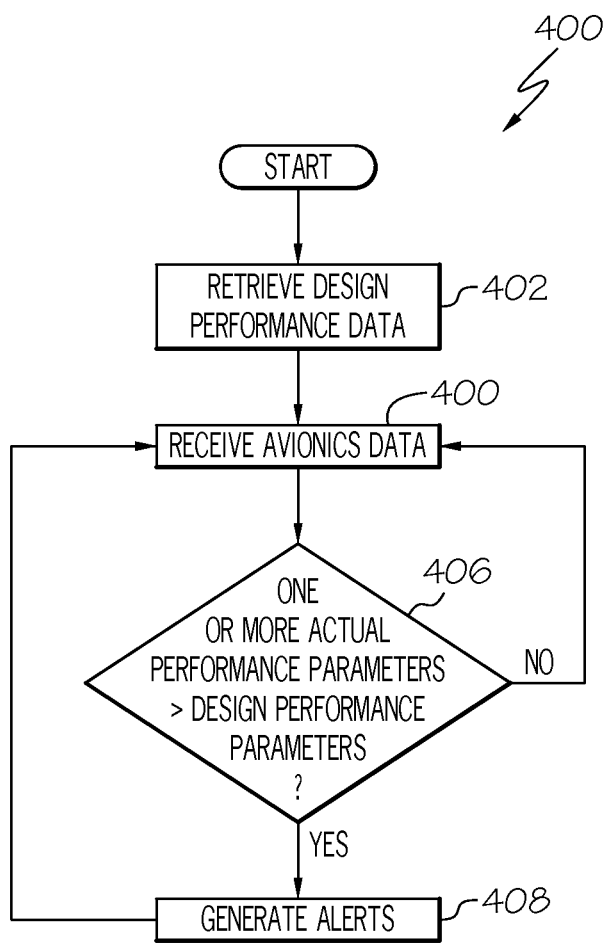
FIG. 4 depicts an embodiment of a process, in flowchart form, that may be implemented by the system of FIG. 1.

The functionality of the servo transparency warning system 102 was generally described above. A more detailed description of the process that is implemented by the system 102, and more specifically by the processor 108, will now be described. In doing so reference should be made to FIG. 4, which depicts the process 400 in flowchart form. It should be noted that the reference numerals in parenthesis in the following description refer to like numbered flowchart blocks in FIG. 4.

The process 400, upon being initiated, includes retrieving, from the design performance database 104, data representative of the design performance parameters of the helicopter 100 (402), and receiving the appropriate avionics data from the avionics data source (404). Next, a determination is made as to whether one or more of the actual performance parameters exceed the design performance parameters (406), indicating a servo transparency condition exists. If not, then the process repeats from step (404). If so, then the appropriate visual alerts (graphical and textual) and the aural alert are generated (408). The alerts will continue until the servo transparency condition no longer exists.

The system and method described herein warns helicopter pilots of the potential for servo transparency and/or that the helicopter is in fact experiencing servo transparency. As a result, the pilot is better equipped to implement appropriate corrective action.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A servo transparency warning system for a helicopter, comprising:
 a performance database having stored therein design performance parameters of the helicopter that contribute to servo transparency of the helicopter;
 an avionics data source configured to supply avionics data representative of actual performance parameters that contribute to servo transparency of the helicopter;
 a processor coupled to receive the avionics data from the avionics data source and configured, upon receipt thereof, to compare the actual performance parameters to the design performance parameters and, based upon this comparison, selectively generate one or more alert signals, wherein the one or more alert signals include a visual alert signal; and a visual alert device coupled to receive the visual alert signal and configured, upon receipt thereof, to generate one or more visual alerts, wherein:
the one or more visual alerts comprise a graphical alert and a textual alert,
the graphical alert comprises a plurality of individual graphical alerts, each individual graphical alert associated with a different one of the design performance parameters that contribute to the servo transparency of the helicopter, and
the design performance parameters are performance parameter limits of the helicopter that are published in a flight manual associated with the helicopter, and include design weight, design altitude, design airspeed, and design pitch angle values.

2. The system of claim 1, wherein the textual alert comprises a rendered phrase.

3. The system of claim 1, wherein:
the one or more alert signals include an aural alert signal; and
the system further comprises an aural alert device coupled to receive the aural alert signal and configured, upon receipt thereof, to generate an audible sound.

4. The system of claim 3, wherein the audible sound comprises an audible phrase.

5. The system of claim 1, wherein the avionics data includes data representative of the design performance parameters.

6. The system of claim 1, wherein the avionics data includes actual helicopter weight, actual helicopter altitude, actual helicopter airspeed, and actual helicopter pitch angle.

7. The system of claim 6, wherein the avionics data source comprises:
a flight management system; and
a plurality of sensors.

8. The system of claim 7, wherein:
the flight management system supplies actual helicopter weight; and
the plurality of sensors supply actual helicopter altitude, actual helicopter airspeed, and actual helicopter pitch angle.

9. A servo transparency warning system for a helicopter, comprising:
a performance database having stored therein design performance parameters of the helicopter that contribute to servo transparency of the helicopter;
an avionics data source configured to supply avionics data representative of actual performance parameters that contribute to servo transparency of the helicopter;
a processor coupled to receive the avionics data from the avionics data source and configured, upon receipt thereof, to compare the actual performance parameters to the design performance parameters and, based upon this comparison, selectively generate a visual alert signal and an aural alert signal;
a visual alert device coupled to receive the visual alert signal and configured, upon receipt thereof, to generate one or more visual alerts; and
an aural alert device coupled to receive the aural alert signal and configured, upon receipt thereof, to generate an audible sound, wherein:
the one or more visual alerts comprise a graphical alert and a textual alert,
the graphical alert comprises a plurality of individual graphical alerts, each individual graphical alert associated with a different one of the design performance parameters,
the textual alert comprises a rendered phrase,
the design performance parameters comprise performance parameter limits of the helicopter that are published in a flight manual associated with the helicopter, and
the performance parameter limits include design weight, design altitude, design airspeed, and design pitch angle values.

10. The system of claim 9, wherein the audible sound comprises an audible phrase.

11. The system of claim 9, wherein the avionics data includes helicopter weight, actual helicopter altitude, actual helicopter airspeed, and actual helicopter pitch angle.

12. The system of claim 11 wherein:
the avionics data source comprises a flight management system and a plurality of sensors;
the flight management system supplies actual helicopter weight; and
the plurality of sensors supply actual helicopter altitude, actual helicopter airspeed, and actual helicopter pitch angle.

13. A method of warning a pilot of a helicopter about a servo transparency condition, comprising the steps of:
retrieving, from a design performance database, a plurality of design performance parameters of the helicopter;
receiving avionics data from an avionics data source, the avionics data representative of a plurality of actual performance parameters of the helicopter;
processing the design performance parameters and the avionics data to determine whether one or more of the actual performance parameters exceed the design performance parameters, thereby indicating a servo transparency condition exists;
generating one or more alerts when the servo transparency condition exists, wherein the one or more alert signals include a visual alert signal; and
generating, in response to the visual alert signal, one or more visual alerts using a visual alert device, wherein:
the one or more visual alerts comprise a graphical alert and a textual alert,
the graphical alert comprises a plurality of individual graphical alerts, each individual graphical alert associated with a different one of the design performance parameters that contribute to the servo transparency of the helicopter, and
the design performance parameters are performance parameter limits of the helicopter that are published in a flight manual associated with the helicopter, and include design weight, design altitude, design airspeed, and design pitch angle values.

* * * * *